May 27, 1952 C. F. CARTER Re. 23,504

VACUUM HEAD FOR FILLING CONTAINERS WITH POWDERS

Original Filed Sept. 23, 1946

INVENTOR.
CLARENCE F. CARTER
BY Benedict & Swartwood
ATTORNEYS

Reissued May 27, 1952 Re. 23,504

UNITED STATES PATENT OFFICE 23,504

VACUUM HEAD FOR FILLING CONTAINERS WITH POWDERS

Clarence F. Carter, Danville, Ill.

Original No. 2,513,143, dated June 27, 1950, Serial No. 698,605, September 23, 1946. Application for reissue June 8, 1951, Serial No. 230,568

13 Claims. (Cl. 226—116)

Matter enclosed in heavy brackets [ ] appears in the original patent but forms no part of this reissue specification; matter printed in italics indicates the additions made by reissue.

This invention relates to an apparatus for filling collapsible containers with comminuted solids. More particularly it relates to a new filling head and shroud which can be used with a machine such as that described in my United States Patent 2,360,198, especially for filling boxes, cartons, bags or other containers which have folding flaps as a closure means, or which must be supported in filling position.

It is an object of the invention to provide an improved filling head by which collapsible containers closed by folding flaps, are guided into filling position in a shrouded filling head with the flaps held so that they do not interfere with the filling operation, the container being gripped by an inflated means to form an air tight seal or joint near the top at about the level to which the container is to be filled.

It is a further object of the invention to provide a means for firmly gripping the container near the open top forming an air tight joint around its entire periphery while it is held in filling position, in order that the pressure may be changed equally and simultaneously inside and outside the container.

It is a further object to provide an improvement in a machine for filling containers with solid particles by creating a vacuum in and around the container, the improvement comprising a member having a part adapted to fit loosely inside the open top of a container, another member spaced therefrom to fit loosely around the outside of said container, said parts forming an opening to receive the container closure means and a limited portion of the side walls, and means operable, for example by expansion or inflation to close said opening to make an air tight joint. Means are also provided to guide the container closure means into the opening.

When filling collapsible containers such as cardboard boxes closed by folding flaps, and especially when using vacuum type machines employing an equalizing shroud to prevent collapsing the container, problems exist in guiding the container into position, holding it during the filling operation, and at the same time forming an air tight joint around the top of the container. This permits the shroud and the inside of the container to be evacuated without leakage of air around the top of the container.

In the case of rigid containers, such as metal cans, closed by a separate lid, there is usually no need for the shroud, and the top of the can is usually held firmly against a resilient ring of suitable contour which effectively seals it from atmospheric leaks when in filling position. There are no flaps to interfere, and the can is strong enough to withstand the pressure differential. Even with certain collapsible containers having a separate lid, the same type of device, with the shroud added, can be used as is shown in the above mentioned patent.

However bags and boxes closed by flaps or by folding the open end or which are too fragile to withstand pressing against a resilient ring, cannot be handled in this way, either because the container is not rigid enough to be pressed sufficiently hard against the sealing ring to form the air tight joint necessary to accomplish the filling operation, or because the flaps interfere.

The present invention permits the air tight joint to be formed by means of a tube which, by inflating it, can be brought to bear against the periphery of the container adjacent the top, either inside or outside, so as to press the container against a supporting lip or edge of the filling head or shroud, thereby forming the desired air tight joint.

In one specific embodiment the invention comprises an improved filling device for vacuum type machines for filling containers with comminuted solid, which comprises a vacuum filling head having an opening into a hopper, a pair of screened openings adjacent the hopper opening, said screened openings connecting with ducts for withdrawing and admitting air, a flanged throat piece adapted to fit inside a container to be filled, closure-guide members attached thereto, a part of said head adapted to fit around the outside of the container, said last mentioned part and said throat piece forming an opening conforming in shape and size to the outline of the vessel to permit entrance of the closure flaps and to permit limited egress of the top of the container, when in filling position, means operable to close said opening, and a vacuum shroud adapted to surround a container when in filling position, said shroud being closable by container-lifting means forming a part of the machine.

Referring to the drawings.

Figure 1:
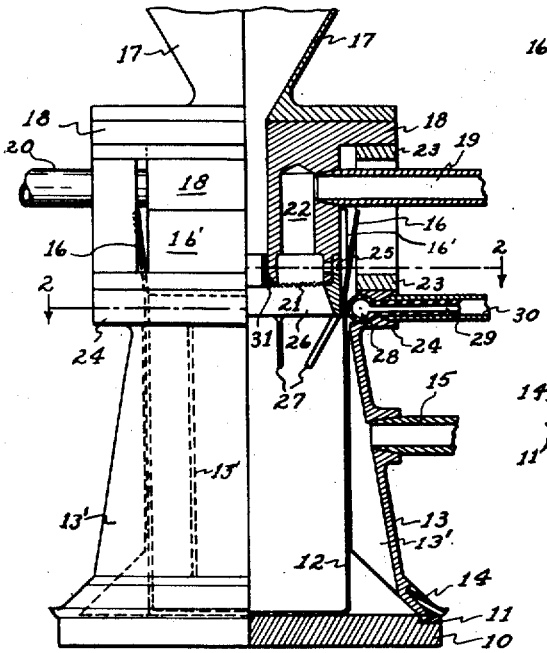
Figure 1 represents a side view partly in section of the filling head.

Referring to Figure 1, a lifting platform 10 is provided, preferably having a resilient ring 11 around the outer rim thereof. The lifter may be actuated in a manner illustrated in the above mentioned Patent 2,360,198.

A container, 12, is placed upon the lifting platform 10 which can then be elevated by a suitable means until the container is in filling position within the shroud 13. A rubber skirt or flap 14 around the bottom of the flared shroud 13 rests against resilient ring 11 forming a continuous seal, thereby completely housing the container 12 within the shroud and preventing leakage of air when the shroud is evacuated. The shroud may be evacuated through line 15 which leads to a source of vacuum not shown. The head as illustrated is used in conjunction with a rectangular pasteboard carton having the usual folding closure flaps 16 and 16', there being two short flaps on each end and two flaps on each side which fold in and overlap to close the box. The height of the shroud is such that when the lifting platform 10 is in position the flaps extend into the closure-receiving openings between the flanged inner throat 26 of the filling head and the outer shroud and support 23 and 24. The filling head shown in Figure 1 comprises a hopper 17 containing the powder. The hopper 17 opens directly to the interior of the carton when it is in filling position. The hopper can be movable, for example rotatable, and can have a plurality of similar heads depending therefrom. The head comprises a body 18 to which the hopper is fastened by conventional means, not shown, such as cap screws or the like. Openings are provided in the body 18 of the head for vacuum ducts 19 and 20 leading to chamber 22, the outlet of which is covered by a screen 21, forming one division of the filling head. There is another division in the head on the left hand side corresponding to this one. This is similar to the device illustrated in Figure 3, attention being called to chambers 40, 41, lines 38, 39 and screens 42, 43. Shroud supports 23 form the means of assembling body 18 with shroud 13 which has a flange 24 for this purpose. This part fits around the outside of the container 12.

Attached to the body 18 by means of screws 25 through a flush fitting lip is a flanged piece 26 forming a throat fitting loosely inside the open end of the container 12. The throat piece extends into container 12 a distance of about ⅛ to ½ inch, sufficient for it to be gripped by member 28 which is operable to close the opening formed by the throat piece and part of the head and shroud fitting outside the container. Depending from the throat piece 26 and sloping inwardly are guides 27. These serve to spread flaps 16 and 17 and to guide them into the closure receiving opening just described, and to guide the open end of the container 12 into position around throat piece 26, as the lifting plate raises the container 12 into filling position. The lower part of the throat piece fits just inside the open top below the point at which the flaps 16 and 17 join the box.

Figure 4:
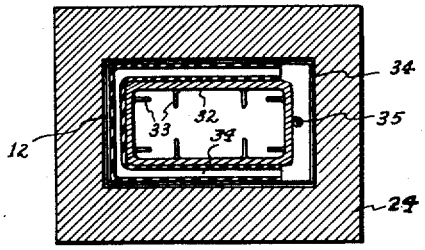
Figure 4 is a plan view in section along the lines 4—4 of Figure 3.
Figure 2:
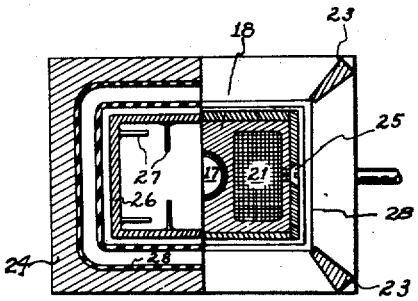
Figure 2 is a plan view in section along the lines 2—2 of Figure 1.

The throat piece 26 also serves to clamp screen 21 into place. The screen is cut slightly larger than the throat to cover the entire area inside the throat. The screen is held in place between a downwardly extending lip of body 18 and the flanged edge of member 26. A portion of the screen is cut away to correspond to the opening of hopper 17 through body 18, this opening usually being circular. The lower end of the body 18 forming this opening from hopper 17 is tapered outwardly. A male insert 31 fits inside this opening and is flared at the end to correspond to the taper, so as to grip the screen 21 and hold it in place. Insert 31 is held in place by any suitable means. The screen 21 thus is held firmly over the lower end of chamber 22 and prevents powder from entering the passage way and duct 19 when the latter is evacuated. At the same time powder can flow from hopper 17 into the container without interference when the interior is evacuated through chamber 22 and duct 19. The top of shroud 13 is flanged as indicated at 24. In the embodiment shown in Figures 1 and 2, a groove or channel is cut in flange 24 to receive expandable tube 28 which is made of rubber, synthetic rubber or other elastomer. The channel is preferably semi-circular in cross section. The rubber tube is continuous around the inside of the boss or flange 24 except for an outlet 29 through which compressed air can be introduced and allowed to escape. The outlet 29 is enclosed within a pipe 30 leading into boss 24 from a source of compressed air which when admitted, expands the tube 28 thus closing the closure-receiving opening. Thus, when the box 12 is in filling position, compressed air is introduced through pipe 30 and inlet tube 29 into the rubber tube 28 causing it to expand and press against the upper portion of the open top of the box 12 which in turn presses against the inside edge of the throat piece 26, thus forming an air tight joint preventing air being drawn either into the shroud or the inside of the box when vacuum is supplied. The shroud is closed at the bottom by lift platform 10 as described. The air can be withdrawn from the shroud around the exterior of the box through duct 15 at the same time it is withdrawn from the interior of the box through screened head 21, passage 22 and duct 19. Ducts 15 and 19 are attached to a source of vacuum so that the pressure inside and outside the box is about the same at all times. Because of the difference in pressure between the interior of the box and on the powder in the hopper, the powder is drawn through duct 17 into the box 12. In this manner the box is filled to capacity.

The preferred operation is carried out withdrawing air from first one side and then the other of the divided filling head with an interval between in which the pressure is restored to atmospheric by allowing air to flow back through the duct which has been evacuated, thus clearing the screen of powder that may have been accumulated thereon. By alternating the evacuation and relief of pressure between the heads, a rapid and uniform filling operation is accomplished.

When the filling is complete, pressure is restored to normal both in box 12 and shroud 13. Expanded tube 28 is deflated thus releasing its grip on the box. Lift plate 10 is lowered, removing the box from filling position. It is then removed from the lift plate, and replaced by an empty container and the operation is repeated. The filled box is closed and sealed by suitable means.

Figure 3:
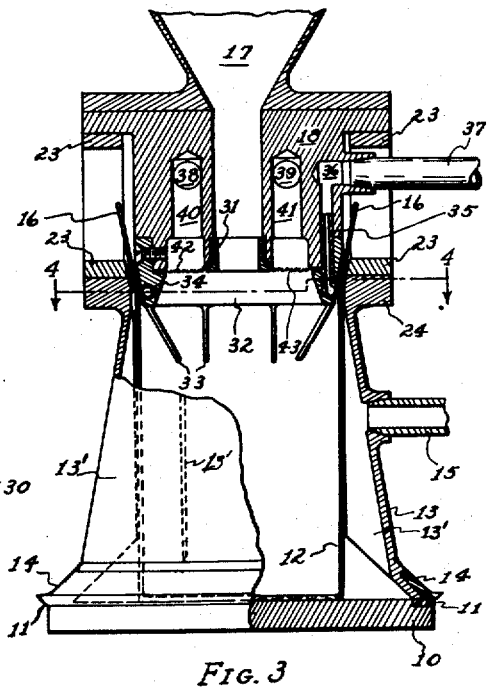
Figure 3 is another embodiment of the invention partly in section.

Figure 3 illustrates a modification in which the expandable tube is in the flanged throat member and closes the closure-passage by expanding outwardly against the inside of the open top of the container which in turn is thrust against flange 24, thereby sealing it in such a way that it can be evacuated in a manner described above in connection with Figures 1 and 2. The body 18 contains compartments 40 and 41 connected with ducts 38 and 39 connected with a source of vacuum. These compartments are covered by screens 42 and 43 held in position by member 31 and the flanged edge of throat piece 32 which is fastened to the body 18 in a manner similar to that previously described in connection with Figure 1. The flap or closure-guides 33, are similar to guides 27 shown in Figures 1 and 2. A channel or groove is cut around the exterior portion of throat piece 32, running circumferentially and parallel with the sides of the container, into which an expandable tube 34 fits. An outlet tube 35 extends through a vertical passage 36 drilled in the throat piece 32 and extending into body 18. This passage opens into a duct 37 connected with a source of compressed air. Vacuum ducts 38 and 39 lead into passages 40 and 41 within head 18 and these in turn, communicate with the screened openings 42 and 43 through which the air contained within container 12 may be withdrawn by the use of an appropriate valving system. In operation the lifting plate 10 thrusts the container 12 upward and the flaps of the container slide along the guide prongs 33 into the flap- or closure-receiving passageway between the throat piece 32 and body 18 on the one side and flange 24 on the other. Compressed air is introduced through duct 37 and causes tube 34 to expand and press the upper lip of the container against the shroud, thereby sealing it. By evacuating the container alternately through screens 42 and 43 and at the same time evacuating the shroud through line 15, powder is caused to flow through duct 17 into the interior of the container. The screens are cleared as above described.

The flanged member 24 and support 23 can be integral with body 18, and shroud 13 can be attached thereto.

The rubber members 28 can be actuated by cams, for example to press against the sides of the container and fill the opening. Expandable members 28 and 34 can be combined in one head.

In order to prevent certain types of containers from bulging due to slight differences in pressure inside and outside the container, fins 13' may be provided. These also aid in guiding the container into position. The preferred embodiments of my invention are described but it should be understood that modification thereof within the scope of one skilled in the art may come within its scope.

I claim as my invention:

1. A filling head for vacuum type machines adapted to fill containers with powdered solids, which comprises means for attaching said head to a hopper, a body having a central opening for passing powder from said hopper into a container when the latter is in filling position with relation to said head, a first screened opening in said body, a second screened opening in said body, ducts connecting said screened openings with a source of reduced pressure, a throat piece adapted to fit loosely inside a container to be filled, said throat piece comprising guide members for guiding said container into position around said throat piece, a member spaced from said throat piece and lying around it thereby forming an opening adapted to receive the closure means of said container and a limited portion of its side walls, an inflatable member adapted when inflated to press against the portion of said container within said opening thereby forming an air tight joint, a shroud, means for attaching said shroud to the filling head, means for attaching said shroud to a source of vacuum, and means on said shroud engageable with a lift plate of the filling machine when said container is in filling position to form an air tight joint.

2. A filling head for vacuum type machines adapted to fill containers with comminuted solids, which comprises means for attaching said head to a hopper, a body having an opening for passing comminuted solids from said hopper into a container when the latter is in filling position with relation to said head, a screened opening in said body, ducts connecting said screened opening with a source of reduced pressure, a throat piece adapted to fit loosely inside a container to be filled, an annular member spaced from said throat piece defining an opening adapted to receive the closure means of said container and a limited portion of its side walls, an expandable member adapted when expanded to press against the portion of said container within said opening, thereby forming a vacuum tight joint, a shroud, means for engaging said shroud and said filling head, means for attaching said shroud to a source of vacuum, and means on said shroud engageable with a container lift plate of the filling machine forming a vacuum tight joint when a container is in filling position.

3. The apparatus of claim 2 wherein the expandable member is incorporated in said throat piece.

4. The apparatus of claim 2 wherein the expandable member is incorporated in said annular member.

5. The apparatus of claim 2 wherein the shroud comprises container positioning guides.

*6. A filling head for vacuum type machines adapted to fill containers with flowable matter, which comprises: a body having a central opening for passing material into a container when the container is in filling position with relation to said head, a second opening in said body communicating with the interior of a container when in said filling position, said body having a duct connecting said second opening with a source of reduced pressure for reducing the pressure in said container, a throat-piece adapted to fit loosely with slight clearance inside a container to be filled, a member spaced from said throat-piece and lying around it thereby forming a third opening adapted to receive the upper end of said container, and sealing means operable prior to reduction of pressure in said container arranged to press laterally against the portion of said container within said third opening thereby pressing it for a distance equal to said clearance and thus forming an air-tight joint.*

*7. A filling head for vacuum type machines adapted to fill containers with flowable matter, which comprises: a body having a first opening for passing flowable material into a container having closure flaps when the container is in filling position with relation to said head, a second opening in said body communicating with the interior of a container when in said filling position, said body having a duct connecting said second opening with a source of reduced pressure for reducing the pressure in said container, a throat-piece adapted to fit loosely inside said container, an annular member spaced from said throat-piece defining a third opening adapted to receive the closure flaps of said container and a limited portion of its side walls, and sealing means operable prior to reduction of pressure in said container arranged to press laterally against the*

*portion of said container within said third opening, thereby forming a vacuum-tight joint.*

*8. A filling head for vacuum type machines adapted to fill cartons with flowable matter, which comprises: a body having a central opening for passing material into a carton having closure flaps when the carton is in filling position with relation to said head, said body having an opening and a duct connecting said opening with a source of reduced pressure, a throat-piece adapted to fit loosely inside a carton to be filled, said throat-piece comprising guide members for guiding the closure flaps of said carton into position around the outside of said throat-piece, a member spaced from said throat-piece and lying around it thereby forming an opening of a height sufficient to receive the closure flaps of said carton and a limited portion of its side walls, a sealing member arranged to press against the portion of the side walls of said carton within said last-mentioned opening thereby forming an air-tight seal, a shroud forming a continuation of said member enclosing the sides of said carton, a plate for supporting said carton in said shroud in filling position and cooperable with the lower end of said shroud to form a closure therefor, said shroud having a passage communicating with the exterior thereof and connectible with a source of reduced pressure, and fins in said shroud for guiding said carton into filling position.*

*9. A vacuum type filling machine adapted to fill containers having a bottom, side wall forming portions and an open top with finely divided flowable solid material comprising: a head having a filling opening through which the finely divided material may flow into a container with a portion of the head disposed within the open mouth of the container, a shroud for the container, separate conduit means for simultaneously producing sub-atmospheric pressure within the container and in the portion of the shroud disposed around the container, and sealing means laterally engageable with the side wall forming portions of the container for preventing communication between the interior of the container, while under sub-atmospheric pressure, and that portion of the interior of the shroud which is also under sub-atmospheric pressure.*

*10. A filling machine as defined in claim 9 wherein the extreme upper portion of the body of the container is exposed to atmospheric pressure while sub-atmospheric pressure is being maintained in the interior of said container and the interior of said shroud.*

*11. A vacuum type filling machine adapted to fill containers having a bottom, side wall forming portions and an open top with finely divided flowable solid material comprising: a head having a filling opening through which finely divided material may flow into a container with a portion of the head disposed within the open mouth of the container, a shroud for the container, sealing means adapted to be moved into lateral engagement with the side wall forming portions of the container in a zone spaced from that end portion of the container body having the open mouth for preventing communication between the interior of the container and the interior of the shroud, a conduit communicating with the interior of the container when the latter is in filling position and has been thus sealed, and a separate conduit communicating with the shroud whereby to permit the simultaneous creation of sub-atmospheric pressure within the container and within the portion of the shroud surrounding the container.*

*12. A filling machine as defined in claim 11 wherein the portion of the body of the container between said sealing means and the open end of the container is exposed to atmospheric pressure while the sub-atmospheric pressure is being maintained in the interior of the container and in the interior of said shroud.*

*13. The method of filling a container having a bottom, side wall forming portions and an open top with flowable solid material, comprising: creating a sub-atmospheric pressure within the container to induce the flow of said flowable solid material thereinto; creating a sub-atmospheric pressure around the exterior of said container in a region spaced from and below the open mouth of the container to prevent said container from collapsing under the influence of the sub-atmospheric pressure produced therein to effect filling thereof; and laterally sealing the side wall forming portions of the container below the open mouth of the container to prevent communication between the sub-atmospheric pressure within the container and the sub-atmospheric pressure around the exterior of the container.*

CLARENCE F. CARTER.

REFERENCES CITED

The following references are of record in the file of this patent or the original patent:

UNITED STATES PATENTS

| Number | Name | Date |
|---|---|---|
| 1,007,358 | Joplin | Oct. 31, 1911 |
| 1,037,824 | Fasling | Sept. 3, 1912 |
| 1,045,567 | Lannmark | Nov. 26, 1912 |
| 1,978,913 | Ricci | Oct. 30, 1934 |
| 2,126,163 | Young et al. | Aug. 9, 1938 |
| 2,170,469 | Carter | Aug. 22, 1939 |
| 2,178,494 | Richardson | Oct. 31, 1939 |
| 2,262,620 | Neuman | Nov. 11, 1941 |
| 2,322,090 | Hobbie | June 15, 1943 |
| 2,531,743 | Ray | Nov. 28, 1950 |
| 2,537,333 | Delamere | Jan. 9, 1951 |

FOREIGN PATENTS

| Number | Country | Date |
|---|---|---|
| 492,560 | France | Mar. 25, 1919 |